United States Patent [19]
Toyama et al.

[11] 3,949,581
[45] Apr. 13, 1976

[54] STEERING LOCK ASSEMBLY FOR DIESEL MOTOR VEHICLES

[75] Inventors: Shigeo Toyama, Okazaki; Yutaka Tomizu, Toyota, both of Japan

[73] Assignee: Toyota Jidosha Kogyo Kabushiki Kaisha, Toyota, Japan

[22] Filed: June 14, 1974

[21] Appl. No.: 479,450

[30] Foreign Application Priority Data
Sept. 14, 1973 Japan.............................. 48-103187

[52] U.S. Cl. ..................... 70/239; 70/243; 70/252; 70/257
[51] Int. Cl.² ................... B60R 25/04; B60R 25/02
[58] Field of Search ............ 70/238, 239, 243, 252, 70/256, 257; 123/198 B

[56] References Cited
UNITED STATES PATENTS
3,797,287  3/1974  Iba et al.................................. 70/239
FOREIGN PATENTS OR APPLICATIONS
1,191,444  5/1970  United Kingdom.................... 70/238

*Primary Examiner*—Albert G. Craig, Jr.
*Attorney, Agent, or Firm*—Stevens, Davis, Miller & Mosher

[57] ABSTRACT

A steering lock assembly for preventing the burglary of diesel motor vehicles. The assembly includes an operating rod coupled to a fuel injection pump for deactivating the pump. The operating rod is axially movable in a guide sleeve and has a recess formed in the lower portion thereof. The assembly also includes a steering lock device actuated by a steering lock actuating device for preventing rotation of the steering shaft of a vehicle. The operating rod and steering lock actuating device are connected through a rocker arm and a wire attached to one end of the rocker arm so that when the operating rod is pulled to an engine stop position, the steering lock device is actuated by the steering lock actuating device to prevent rotation of said steering shaft.

3 Claims, 14 Drawing Figures

STEERING LOCK ASSEMBLY FOR DIESEL MOTOR VEHICLES

BACKGROUND OF THE INVENTION

The present invention relates to a steering lock assembly for preventing the burglary of diesel motor vehicles.

It is very dangerous to mount the steering lock assemblies for gasoline motor vehicles upon diesel motor vehicles. For instance, when a diesel motor vehicle, which has been stopped on a downhill incline, begins to move downhill, the engine is automatically started with the result of the runaway of the vehicle.

SUMMARY OF THE INVENTION

One of the objects of the present invention is therefore to provide a steering lock assembly for diesel motor vehicles which is operatively coupled to a device for deactivating a fuel injection pump so as to stop the diesel engine.

DESCRIPTION OF THE PREFERRED EMBODIMENT

Figure 1:
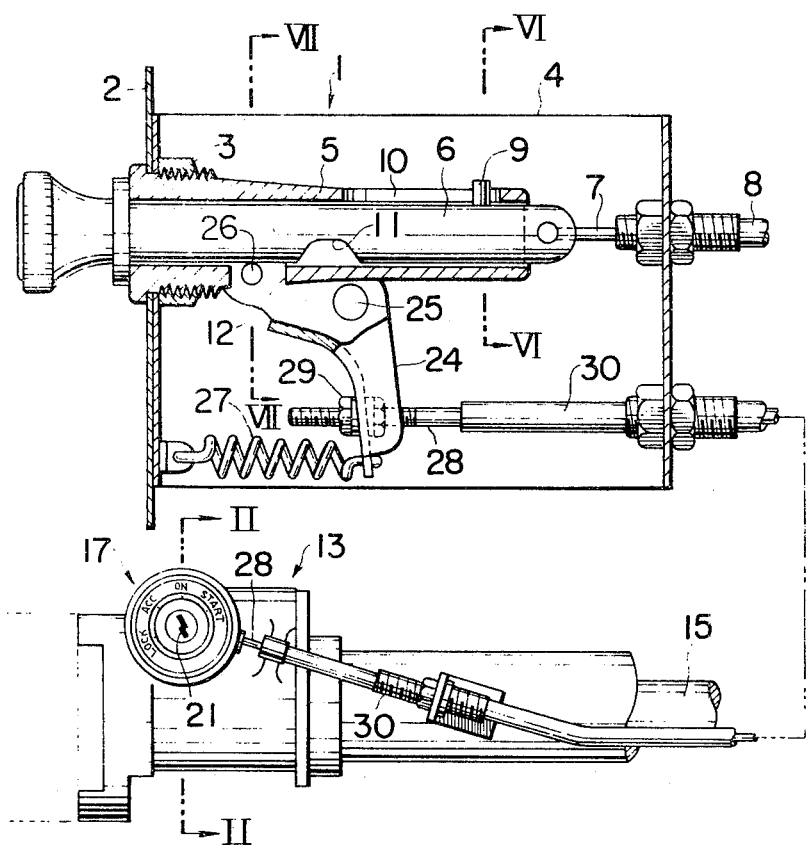
FIG. 1 is a schematic view of a steering lock assembly for diesel motor vehicles in accordance with the present invention.
Figure 2:
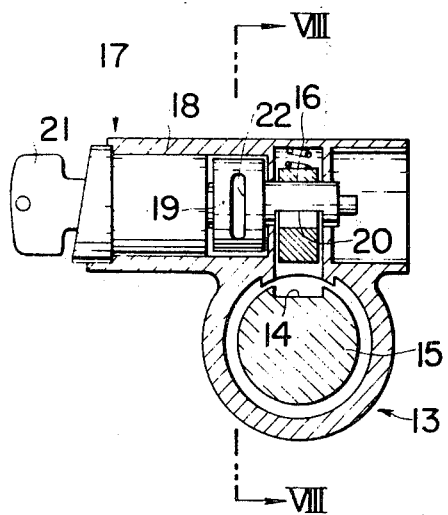
FIG. 2 is a sectional view taken along the line II—II of FIG. 1.
Figure 3:
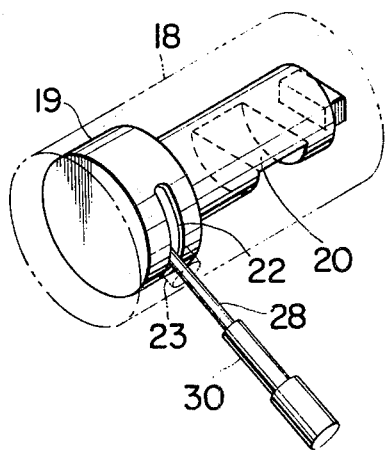
FIG. 3 is a perspective view of a steering lock actuating device.

Referring to FIG. 1, a device for stopping an engine generally indicated by 1 comprises a bracket 4 mounted with a nut 3 on a panel 2, a guide sleeve 5 attached to the bracket, an engine stop operating rod 6 slidably fitted into the guide sleeve 5, and a flexible wire 7 coupled to the operating rod 6 and a fuel injection pump (not shown) so that when the operating rod 6 is operated the fuel injection pump is deactivated. The flexible wire 7 is fitted into a flexible cable 8.

Figure 4:
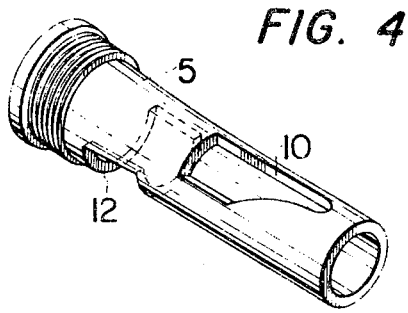
FIG. 4 is a perspective view of a guide sleeve.
Figure 5:
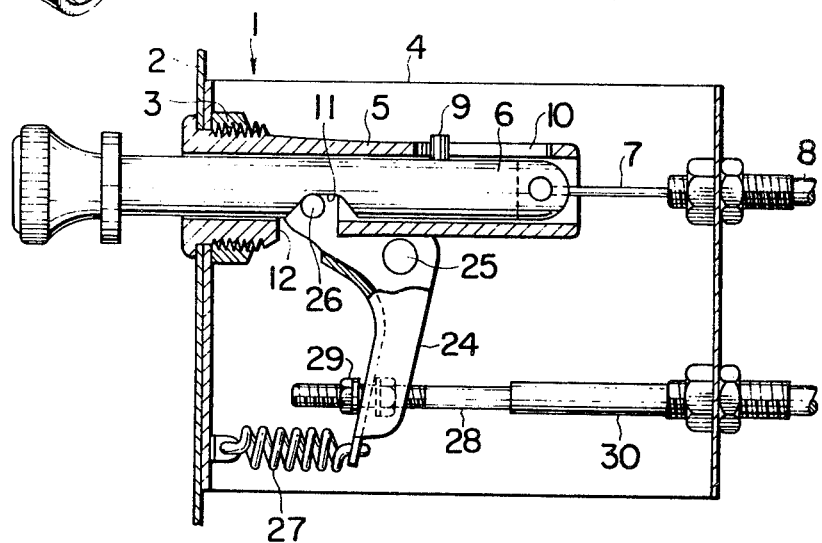
FIG. 5 is a view similar to FIG. 1 illustrating an operating rod being pulled to stop the engine.
Figure 6A:
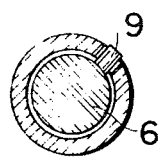
FIGS. 6a, 6b, 6c are sectional views taken along the line VI—VI of FIG. 1 and showing various operational positions of the operating rod.
Figure 6B:
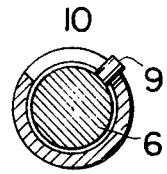
Figure 6C:
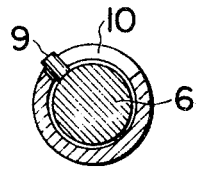
Figure 7A:
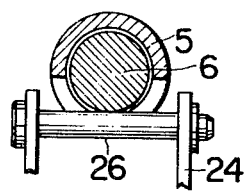
FIGS. 7a, 7b, 7c are sectional views taken along the line VII—VII of FIG. 1 and showing various operational positions of the operating rod relative to the roller.
Figure 7B:
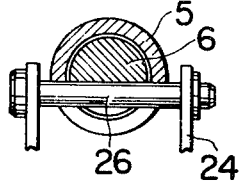
Figure 7C:
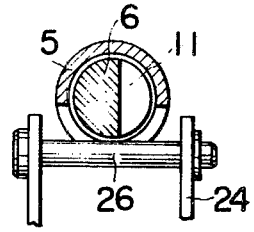

The guide sleeve 5 is provided with a guide groove 10 into which is fitted a pin 9 of the operating rod 6 as best shown in FIGS. 1, 4, and 5. The operating rod 6 is provided with a recess 11 formed in the lower portion thereof in opposed relation with an opening 12 formed through the guide sleeve 5.

A steering lock device generally indicated by 13 comprises a steering shaft 15 with a groove 14, a stopper pin 16 disposed in opposed relation with the groove 14 of the steering shaft 15, and a steering lock actuating device generally indicated by 17 and adapted to cause the stopper pin 16 to move into the groove 14 of the steering shaft 15, thereby preventing the rotation of the steering shaft 15.

The steering lock actuating device 17 comprises a cylindrical casing 18, a rotary shaft 19 rotatably fitted in the casing 18, a cam 20 carried by the rotary shaft 19 in such a way that when the rotary shaft 19 is rotated, the cam 20 may actuate the stopper pin 16, and a key 21 for rotating the rotary shaft 19. The key 21 is used not only for actuating the steering lock actuating device 17 but also for starting the engine. The rotary shaft 19 is provided with an elongated slot 22 formed in the peripheral direction and in opposed relation with a hole 23 formed through the wall of the casing 18.

A lever 24 for locking the operating rod 6 in position for stopping the engine is attached by a pin 25 to the bracket 4. A roller 26 attached to one end (the upper end in FIG. 5) of the lever 24 is located in the opening 12 of the guide sleeve 5. A spring 27 is loaded between the other (lower) end of the lever 24 and the bracket 4 so that the roller 26 may be pressed against the operating rod 6.

A push-pull wire 28 has its one end securely fixed to the other end of the lever 24 with a nut 29 and the other end located in the hole 23 of the casing 18, and is guided by a flexible cable 30. Therefore, the operating rod 6 is operatively linked to the steering lock actuating device 17 as will be described in more detail hereinafter.

Figure 8A:
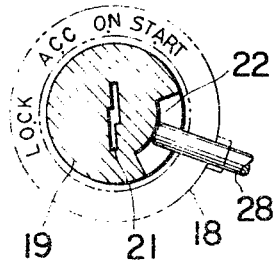
FIGS. 8a, 8b, 8c are sectional views taken along the line VIII—VIII of FIG. 2 and showing various operational positions of the steering lock actuating device relative to the push-pull wire.
Figure 8B:
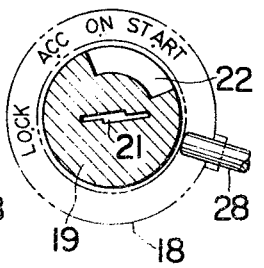
Figure 8C:
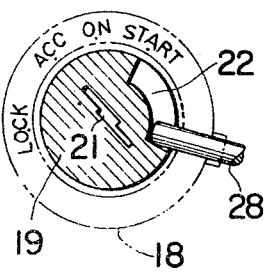

Next the mode of operation of the steering lock device with the above construction will be described. When the operating rod 6 is pulled as shown in FIG. 5, the flexible wire 7 is also pulled so that the fuel injection pump is deactivated to stop the engine. The roller 26 at one end of the rocker 24 is moved into engagement with the recess 11 of the operating rod 6 so that the roller 26 is locked in position. In this case, the rocker 24 is rotated in the clockwise direction about the pin 25 so that the push-pull wire 28 is pulled in the right-hand direction so that the other end of the wire 28 is pulled out of the elongated slot 22 of the rotary shaft 19 of the steering lock actuating device 17 so that the rotation of the rotary shaft 19 may be permitted as shown in FIG. 8b. Then, one rotates the rotary shaft 19 with the key 21 so that the cam 20 causes the stopper pin to be engaged with the groove 14 of the steering shaft 15. Thus, the steering shaft 15 is locked against burglary.

To start the engine, the driver rotates the rotary shaft 19 with the key 21 to cause the stopper pin 16 to be released from the groove 14 of the steering shaft 15. Thereafter, the driver pushes the operating rod 6 while rotating it so that the roller 26 is forced downwardly by the recess 11 of the rod 6. As a result the rocker 24 is released from the locked position and returned to the initial position shown in FIG. 1. Therefore, the engine may be started.

As described hereinbefore, when the operating rod 6 is in the position shown in FIG. 1, that is when the engine is running or is to be started, the push-pull wire 28 is in engagement with the elongated slot 22 of the rotary shaft 19 of the steering lock actuating device 17 so that the rotation of the rotary shaft 19 is limited. Therefore, the steering shaft 15 cannot be locked. Even when trying to operate the operating rod 6 when the steering lock device 13 is locking the steering shaft 15, the roller 26 is in engagement with the recess 11 of the operating rod 6 so that the operating rod 6 cannot be returned to the engine starting position. Thus, the safety may be ensured.

Since the operating rod 6 is locked in the engine stop position by the rocker 24, there is no fear at all that it will be returned to the engine starting position. Furthermore, the push-pull wire 28 is operatively coupled to the operating rod 6 through the rocking lever 24 and the roller 26 in engagement with the recess 11 of the operating rod 6, so that the impact caused by the movement of the operating rod 6 may be prevented from being directly transmitted to the steering lock device 13. Thus, a long service life of the steering lock assembly may be ensured.

What is claimed is:

1. A steering lock assembly for a diesel motor vehicle having a steering shaft, said steering lock assembly comprising:

first locking means movable into a plurality of positions, means operable in response to movement of said first locking means for locking the steering shaft when said locking means is in one of said plurality of positions, an engagement member displaceable with said first locking means, engine shutdown means axially displaceable into a position for shutting down the engine, said engine shutdown means being rotatable in the engine shutting down position, means defining a recess in said engine shutdown means, second locking means engageable with said recess for axially locking said engine shutdown means, wire means connected with said second locking means to be movable therewith, said wire means being operatively related to said engagement member, means defining a slot in said engagement member for selectively engaging said wire means, and slot being configured to engage said wire means to prevent movement of said first locking means into said one position for locking the steering shaft when the engine is operating, said engagement member being configured to engage said wire means to prevent movement of said engine shutdown means out of the position for shutting down the engine when the first locking means is in said one position for locking the steering shaft, and said recess being configured to disengage said second locking means from said recess to release said engine shutdown means from its axially locked position when said engine shutdown means is rotated.

2. A steering lock assembly for a diesel motor vehicle as claimed in claim 1, further comprising:

a guide sleeve, means defining an axial groove in said guide sleeve, said engine shutdown means comprises an operating rod, said operating rod comprising a pin extending radially therefrom, said operating rod being slidably fitted in said guide sleeve with said pin positioned in said axial groove, and said axial groove is configured so that said operating rod is rotatable into the position for shutting down the engine and is axially displaceable out of the engine shutting down position.

3. A steering lock assembly for a diesel motor vehicle as claimed in claim 2, wherein:

said second locking means comprises a rocker and a roller on one end of said rocker, and said roller being biased against said operating rod.

* * * * *